(12) United States Patent
Thompson et al.

(10) Patent No.: US 11,604,125 B1
(45) Date of Patent: Mar. 14, 2023

(54) LIQUID GAS SAMPLE VAPORIZER CONDITIONING SYSTEM AND METHOD

(71) Applicant: Mustang Sampling, LLC, Ravenswood, WV (US)

(72) Inventors: Kenneth O Thompson, Ravenswood, WV (US); Kevin Warner, The Woodlands, TX (US); William C. Paluch, Jersey Village, TX (US); William Hartson, Houston, TX (US); Timothy L. Querrey, Ravenswood, WV (US)

(73) Assignee: Mustang Sampling, LLC, Ravenswood, WV (US)

( * ) Notice: Subject to any disclaimer, the term of this patent is extended or adjusted under 35 U.S.C. 154(b) by 0 days.

(21) Appl. No.: 17/687,949

(22) Filed: Mar. 7, 2022

(51) Int. Cl.
  *G01N 1/44* (2006.01)
  *H05B 1/02* (2006.01)
  *G01N 30/12* (2006.01)

(52) U.S. Cl.
  CPC .............. *G01N 1/44* (2013.01); *H05B 1/0244* (2013.01); *G01N 2030/126* (2013.01); *H05B 2203/021* (2013.01)

(58) Field of Classification Search
  CPC .............. F17C 2225/0161; G01N 1/44; G01N 33/225; G01N 1/10; G01N 1/22
  See application file for complete search history.

(56) References Cited

U.S. PATENT DOCUMENTS

| | | |
|---|---|---|
| 2,665,239 A | 1/1954 | Howard et al. |
| 3,609,983 A | 10/1971 | Lofredo et al. |
| 3,661,202 A | 5/1972 | Moore |
| 3,933,030 A | 1/1976 | Forster et al. |
| 3,976,450 A | 8/1976 | Marcote et al. |
| 4,296,637 A | 10/1981 | Calamur et al. |
| 4,974,453 A | 12/1990 | Hohorst |
| 5,321,984 A | 6/1994 | Stroupe |
| 5,343,747 A | 9/1994 | Rosen |
| 5,363,874 A | 11/1994 | Henszey et al. |
| 5,505,782 A | 4/1996 | Stauffer |
| 5,544,276 A | 8/1996 | Loux et al. |

(Continued)

OTHER PUBLICATIONS

Coyle, David, et al., "Processes and Pump Services in the LNG Industry," Proceedings of the Twenty-Second International Pump Users Symposium, 2005, pp. 179-185.

(Continued)

*Primary Examiner* — John J Norton
(74) *Attorney, Agent, or Firm* — Cahn & Samuels, LLP

(57) ABSTRACT

An improved liquid vaporization and conditioning system, and associated method, for efficiently vaporizing a liquid sample for accurately determining the constituent components thereof providing enhanced flow rate, pressure and thermal control, the improvement including a combination of a resistance temperature detector, a sweeping bend to, an in-line thermal break, a flow buffering input manifold, enhanced multi-path heater vaporizer construction with four heater units, a vaporizer output mixing manifold and control elements providing a capability for partial shutdown in the event of compromised heating or flow anomalies without risk of flow loss/volume capacity beyond a permissible threshold and an improved, modular heat vaporizer enclosure.

8 Claims, 8 Drawing Sheets

(56) References Cited

U.S. PATENT DOCUMENTS

| | | | |
|---|---|---|---|
| 5,596,154 | A | 1/1997 | Baughman |
| 5,918,595 | A | 7/1999 | Olsson et al. |
| 6,042,634 | A | 3/2000 | Van Tassel et al. |
| 6,408,895 | B1 | 6/2002 | Beam |
| 6,827,046 | B2 | 12/2004 | Welle |
| 6,848,502 | B2 | 2/2005 | Bishop et al. |
| 6,981,850 | B1 | 1/2006 | Maltbie |
| 7,337,616 | B2 | 3/2008 | Meneses et al. |
| 9,562,833 | B2 | 2/2017 | Thompson et al. |
| 10,107,722 | B2 | 10/2018 | Rolston |
| 10,613,006 | B1 | 4/2020 | Thompson et al. |
| 11,144,078 | B2 | 10/2021 | Thompson et al. |
| 11,248,735 | B1 | 2/2022 | Thompson et al. |
| 2003/0228707 | A1 | 12/2003 | Meneses et al. |
| 2006/0157392 | A1* | 7/2006 | Best ............... G01N 11/02 702/50 |
| 2006/0201235 | A1* | 9/2006 | Thompson ............ F17C 6/00 73/61.77 |
| 2007/0137318 | A1* | 6/2007 | Desrochers ........... G01N 1/26 73/863.81 |
| 2007/0204749 | A1* | 9/2007 | Adkins ............ G01N 30/6034 96/101 |
| 2009/0151427 | A1* | 6/2009 | Thompson ............ F17C 6/00 392/394 |
| 2021/0063285 | A1 | 3/2021 | Thompson et al. |
| 2021/0080363 | A1* | 3/2021 | Welker ............... G01N 33/28 |

OTHER PUBLICATIONS

Foss, Michelle M. Ph.D., "Introduction to LNG; An Overview on liquefied natural gas (LNG), its properties, the LNG industry, safety considerations", Energy Economics Research at the Bureau of Economic Geology, Center for Energy Economics, Jan. 2003.

Tarlowski, Janusz, et al., "LNG Import Terminals—Recent Developments," 2005.

United States of America Federal Energy Regulatory Commission, "Notice of Availability of Staff's Responses to Comments on the Consequence Assessment Methods for Incidents Involving Releases from Liquefied Natural Gas Carriers," Jun. 18, 2004.

Energy Information Administration, "U.S. Natural Gas Markets: Mid Term Prospects for Natural Gas Supply", Dec. 2001.

Energy Information Administration, Office of Oil and Gas, "U.S. LNG Markets and Uses," Jan. 2003.

Stockwell, Peter B, et al., "Mercury Measurements in Fossil Fuels, Particularly Petrochemicals," Journal of ASTM International, Jan. 2006, vol. 3, No. 1.

European App. No. EP 05769462.2, Supplementary European Search Report, dated Apr. 5, 2012.

* cited by examiner

LIQUID GAS SAMPLE VAPORIZER CONDITIONING SYSTEM AND METHOD

I. FIELD OF THE INVENTION

This invention relates generally to an improved system and method for the efficient vaporization and measurement of cryogenic liquid natural gas (LNG), has applicability to certain processing of non-cryogenic natural gas liquid (NGL), and most particularly, to vaporizing liquid natural gas samples extracted from a vessel for analysis.

II. BACKGROUND OF THE INVENTION

This invention is concerned with the similar issues confronted by the systems described and disclosed in U.S. patent U.S. Pat. No. 7,484,404 and it and its progeny and U.S. Patent U.S. Pat No. 8,056,399 and its progeny. LNG is produced by taking natural gas from a production field, removing impurities, and liquefying the natural gas. In the liquefaction process, the gas is cooled to a temperature of approximately −162° C. (−260° F.). One volume of this condensed, cryogenic liquid form of natural gas occupies about 1/600th of the volume of vaporized natural gas. Typically, natural gas will be converted to the liquid form for loading and transport or conveyance through or to a vessel. Pipelines, storage tanks, transport vehicles all comprise vessels for containing natural gas. By way of example, LNG is loaded onto ships for transport to a receiving facility where it is off-loaded typically into storage tanks. In this process, particularly in the context of custody transfer, accurate analysis of the constituents and energy value (BTU value) is crucial because the BTU value/constituents of a shipment is subject to change in transit due to, for example, evaporation.

An important part of accurate analysis in gas sample conditioning implicates the process of vaporization of a liquid sample extracted via a probe from a gas containing vessel, e.g., a pipeline. Once the liquid sample is extracted, it is typically communicated from the take-off probe through a corrosion-resistant super alloy, such as stainless-steel tubing, with a relatively small diameter to a sample conditioner for vaporization, pressure regulation, and ultimately to an analyzer, such as a chromatograph, for analysis.

When the extracted liquid sample is vaporized, the vapor stage is subject to substantial pressure reduction to a relatively low-pressure zone, e.g., 10-30 psig (68.9 kPa-206.8 kPa), which is an acceptable pressure for a typical analyzer/chromatograph. During the entire liquid to vapor process, it is important to prevent pre-vaporization and to maintain the vapor at a temperature and pressure outside the vapor phase curve to minimize the risk of Joule Thomson hydrocarbon dew point dropout in the form of condensation.

If such condensation occurs, the input to the analyzer/chromatograph may be fouled with liquid, the integrity of any obtained measurement compromised, and damage to the chromatograph from, for example, column bleed is likely. At best, the result is generation of false readings from ghost peaks and the like, and at worst, the analyzer will be rendered inoperable. Uneven flow and pressure drops during the liquid to vapor conversion may also result in false readings as well as decreased system operational accuracy and efficiency.

Accordingly, it is important to maintain the integrity of the liquid sample to the vaporizer and maintain the vaporized liquid sample with minimal pressure and temperature variation to avoid inaccuracies.

Turning to issues associated with vaporization itself, vaporization devices in which a low carbon number hydrocarbon liquid, such as natural gas liquid (NGL) and particularly cryogenic LNG, is vaporized by heating may suffer from development of temperature gradations proximate to a liquid sample entry port. In the case of such temperatures exceeding the heat of vaporization, pre-vaporization of the liquid sample may result. When an extracted liquid sample is subject to partial or complete vaporization proximate to the vaporizer input, but before reaching the flash vaporization chamber, the integrity of the vaporized sample exiting a vaporizer may be compromised by undesirable partitioning of product components (lights, intermediates, and heavies) separating and entering the vaporizer at different times. Such partitioning or separation will generally lead to faulty energy content and compositional analysis. Further, in the event that the pre-vaporized sample is exposed to subsequent cooling or pressure reduction causing partial re-condensation during the passage into the vaporization chamber, further undesirable compositional stratification/partitioning may result. Additionally, where pre-vaporization occurs at the vaporizer input, the cooling effect created by the expansion of the liquid to gas can generate exterior icing upstream of the entry port and thereby augment thermal anomalies which further compromise sample uniformity and integrity. Furthermore, it would be desirable to provide a liquid sample vaporizer and conditioning system with multiple pathways providing redundancy in the event of vaporizer failure to allow for remixing of the vaporized streams and continued operation even at reduced pressure and flow levels while maintaining sample integrity by preventing vaporized sample partitioning/condensation. Finally, it is very desirable to minimize start-up time for the system to stabilize and to assure adequate sample flow rates even at lower pressures for custody transfer operations.

Another issue arises in conventional prior art constructs. The vaporizing enclosure does not facilitate ease of replacement of heater cartridge elements because the elements are typically vertically mounted within the enclosure using welded tabs to secure the cartridge on a supporting plate platform and positioned within the coiled heat exchange tubing. Consequently, upon failure of a heater cartridge unit or compromised heating performance indicating replacement, disassembly and reassembly, in addition to time and labor requirements, entails a degree of difficulty requiring skill, and shutdown for an unnecessarily extended period.

Accordingly, continued needs exists for improved sample processing from take-off to analysis and improved and improved vapor enclosure assembly.

III. SUMMARY OF THE INVENTION

Illustrative, non-limiting embodiments of the present invention may overcome the aforementioned and other disadvantages associated with related art liquid gas vaporization and measurement systems.

It is an object of the present invention to provide an improved system and method for efficiently and accurately sampling and conditioning liquid gas vapor from a liquid sample.

It is an object of the invention to provide a reliable liquid sample vaporizer conditioning system that prevents pre-vaporization of a liquid sample while maintaining suitable temperature, pressure throughout the sample conditioning process to avoid Joule-Thomson condensation while maintaining adequate sample flow.

It is a further object of the invention to provide for enhanced sample pre-vaporization mixing and post vaporization mixing without condensation from pressure loss.

Still another object of this invention is to provide an improved explosion-proof vaporizer enclosure that provides for efficient modular mounting of heat exchange elements comprising coiled tubing wrapped heater cartridges that improve heat exchange, prolong the useful life of the heater cartridges and facilitates access for maintenance and replacement.

To achieve the above and other objects, an embodiment in accordance with the invention includes an improved vaporizer and conditioning system for liquid, including a sample input, a vaporizer operable to receive a liquid sample and convert the received liquid sample gas into vapor gas that is passed to an accumulator tank operable to receive the vaporized sample and a heated pressure regulator for conditioning the accumulated vaporized sample outputted from the accumulator tank to reduce the pressure thereof for passage to a downstream analyzer, the improvement comprising: a resistance temperature detector unit; a sweeping bend, a thermal break for minimizing heat energy transfer; a flow buffering input manifold, splitting the input into multiple outputs with reduced pressure drop and enhanced flow volume uniformity; a multipath vaporizer housing containing a select number of inputs and outputs corresponding to the number of outputs from the flow buffering input manifold and a heater cartridge unit associated with each input characterized by a) an electrically powered heater rod of a select length with an upper end and a lower end, b) coil tubing segment having a select height greater than the heater rod select length to extend above the upper end thereof, and spiral wrapping to minimize spacing between turns, maximize the contact surface area of the coil tubing with the heater rod, and minimize pressure drop across the coil tubing length, c) a thermocouple, disposed below the coil tubing segment and an output; an exit manifold incorporating inputs corresponding to the number of outputs from the vaporizer, each exit manifold input including a shutoff valve to terminate flow from its respective heater cartridge unit, said exit manifold including an interior accumulator chamber to mix the respective inputs into a common output stream, and an output for the common output stream from the interior accumulator chamber; an exit manifold thermocouple associated with the exit manifold outlet stream and a shut off valve for preventing flow when a temperature anomaly is detected by the exit manifold thermocouple, an accumulator tank for receiving the vaporized sample output from the exit manifold and outputting accumulated vaporized sample a heated pressure regulator for conditioning the accumulated vaporized sample outputted from the accumulator to reduce the pressure thereof for passage to a downstream analyzer.

Another embodiment of the invention includes an improved method of vaporizing and conditioning a liquid sample stream for analysis, the improved method comprising the steps of: detecting a liquid sample temperature with a resistance temperature detector; passing the liquid sample stream respectively through a sweeping bend, a thermal break and into a vaporizer input manifold to split the liquid sample stream into a select plurality of vaporizer input streams substantially identical in flow rate, pressure and temperature; outputting each of the select plurality of vaporizer input streams into a vaporizer enclosure with a number of vaporizing pathways corresponding to the select plurality, each vaporizing pathway comprising tubing with an upper liquid inlet and a lower vaporized gas output and a coiled intermediate section spirally wound about a heater cartridge to maximize the heat transfer contact area between said heater cartridge and the coiled intermediate section and a temperature detecting vaporized gas output thermocouple associated with the lower vaporized gas output; inputting the vaporized gas output into a vaporized gas mixing manifold with a plurality of inputs corresponding to the plurality of vaporizing pathways for receiving the output from the plurality of vaporizing pathways where each of the inputs is associated with a shutoff valve for terminating vaporized gas input to the manifold upon detection of a temperature anomaly by the vaporized gas output thermocouple, where the vaporized gas mixing manifold includes a mixing chamber and an outlet for the mixed vaporized sample; outputting the mixed vaporized sample from the vaporized gas mixing manifold through tubing including a thermocouple for detecting the temperature of the output mixed vaporizer sample, said thermocouple being associated with a solenoid controlled valve for terminating flow from the vaporized gas mixing manifold upon detection of a thermal anomaly exceeding a select threshold by the thermocouple; inputting the mixed vaporized sample into a sample accumulator; outputting the accumulated vaporized sample from the sample accumulator to a heated regulator to reduce the sample pressure while maintaining temperature of the accumulated vaporized sample and preventing Joule-Thomson condensation; and passing the accumulated vapor sample from the heated regulator for analysis of constituent components.

Other objects of the invention are provided by an improved explosion proof vaporizer enclosure comprising: a back wall, a top wall and a bottom wall; an upper inlet in the top wall; a lower outlet in the bottom wall; an angled mounting plate defining a front edge and back section affixed to the back wall proximate to the bottom wall, said mounting plate projection at an acute angle from the back wall relative to the bottom wall, said mounting plate including at least one receiving slot formed in the front edge with a tapered slot extending therefrom for a select distance in the direction of the back section; a continuous length of tubing passing through the inlet and defining a liquid input, a coiled section having a pitch to limit spacing gap between coils, said coiled section defining an elongated cylindrical passage of defined diameter and a first length, a lower segment generally orthogonally disposed to the coil elongated cylindrical passage, and a vapor output segment length passing through the lower outlet; a removable elongated heater cartridge with a top portion, a bottom portion and an electrically powered heating element disposed therebetween, said heater cartridge having a diameter corresponding to that of the elongated cylindrical passage where the heating element has a length less than that of the tubing coiled section and the bottom portion projects through the receiving slot of the angled mounting plate; and a releasable clamp for engaging the lower portion of the heater cartridge to secure the heater cartridge to the mounting plate where the vapor outlet segment of the tubing passes through the tapered slot of the mounting plate to the lower outlet in the bottom wall.

The improvements provided by the present intelligent control invention include enlarged vaporizer tubing diameter to minimize pressure drop for higher flow rates, a Resistance Temperature Detector (RTD) unit a sweeping bend to avoid pressure drop during passage through the measuring device a bypass for any liquid sample input possessing to much of a temperature variance, as detected by the RTD, an in-line thermal break to minimize heat transfer from and to prevent introducing a mixed phase sample introduced into the underlying vaporizer, a flow buffering input manifold, possessing an enlarged input mixing chamber that provides for enhanced uniformity of flow volume with reduced pressure drop, enhanced multi-path heater vaporizer construction with four heater units fed by the manifold output with multi-wrapped spiral coil tubing of enlarged diameter to minimize spacing between turns, maximize heat transfer from the heating rod to the sample passing through the coil while avoiding hot spots, and minimize pressure drop across the vaporizer length while also providing a capability for partial shutdown in the event of compromised heating or flow anomalies from a particular heater as detected by an associated thermocouple, without risk of flow loss/volume capacity beyond a permissible threshold.

The invention contemplates a system that has the capacity for being fully 'Intelligent" relying on a PID control unit that is completely automated in the context of temperature, pressure and flow detection with corresponding solenoid shutoff valves actuatable upon detection of anomalous readings falling outside permissible thresholds and associated bypasses to entirely or partially redirect sample input out of the vaporizing and conditioning pathway.

Referring to the improved multi-path explosion-proof vaporizer enclosure assembly contemplated by the invention, it contemplates a more precise multipath structure that provides, prolonged cartridge life, spacing uniformity, modular component mounting, and ease of access not found in the prior art.

Exemplary, non-limiting, embodiments of the present invention are discussed in detail below. While specific configurations and dimensions are discussed to provide a clear understanding, it should be understood that any disclosed dimensions and configurations are provided for illustration purposes only. A person skilled in the relevant art will recognize that, unless otherwise specified, other dimensions and configurations may be used without departing from the spirit and scope of the invention.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

It will be appreciated that as used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

It will also be appreciated that as used herein, any reference to a range of values is intended to encompass every value within that range, including the endpoints of said ranges, unless expressly stated to the contrary.

As used herein "gas" means any type of vapor gas resulting from vaporization of a liquid.

As used herein "liquid" means any type of liquid including cryogenic liquids that may be subject to vaporization and analysis such as liquified natural gas and di-atomics including mixtures thereof, and non-cryogenic liquids including hydrocarbon containing liquid matter such as natural gas liquids, and equivalents As used herein "connected" includes physical, whether direct or indirect, permanently affixed or adjustably mounted. Thus, unless specified, "connected" is intended to embrace any operationally functional connection.

In the following description, reference is made to the accompanying drawings which are provided for illustration purposes as representative of specific exemplary embodiments in which the invention may be practiced In the following description, reference is made to the accompanying drawings which are provided for illustration purposes as representative of specific exemplary embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

Given the following detailed description, it should become apparent to the person having ordinary skill in the art that the invention herein provides an improved liquid gas vaporization and conditioning system and a method thereof for providing significantly augmented efficiencies while mitigating problems of the prior art.

IV. BRIEF DESCRIPTION OF THE DRAWINGS

The aspects of the present invention will become more readily apparent by describing in detail illustrative, non-limiting embodiments thereof with reference to the accompanying drawings, in which:

FIG. 1 is copy of a prior art figure extracted from U.S. Pat. No. 7,484,404.

V. DETAILED DESCRIPTION OF ILLUSTRATIVE, NON-LIMITING EMBODIMENTS

Figure 1:
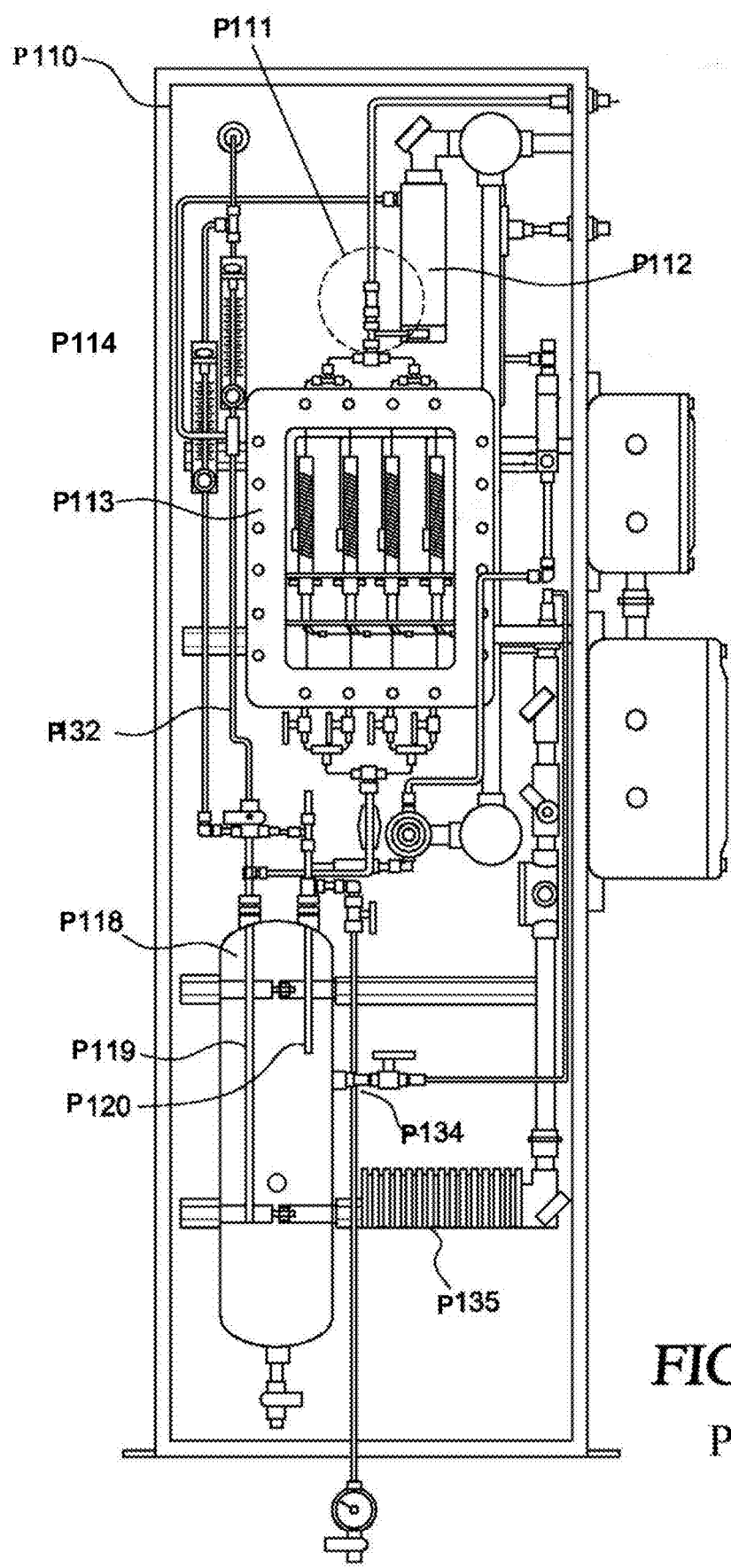

FIG. 1 illustrates the prior art. The drawing is extracted from Applicant's patent U.S. Pat. No. 7,484,404 and its progeny including U.S. Pat. No. 9,057,668. In the prior art embodiment of FIG. 1, LNG is input to the vaporizer cabinet P110 through inlet port P111 located near the top of the cabinet P110. A first stage vaporizer P112 receives a portion of the LNG and a second stage P113 receives the balance of the LNG. The pipe lengths for the pipes bringing LNG into the cabinet are kept as short as possible to minimize any heating of the LNG within the inlet pipes. The second stage vaporizer P113 utilizes four cartridge heaters as shown. In this prior art, both the first and second stages heat the LNG and convert it to vapor gas which is accumulated in accumulator P118. Also, connected to each of the first and second stages, P112 and P113, as well as the accumulator P118, is tubing P132 that exhausts from the cabinet P110 to an LNG vapor return line. Heater P135 is located within the LNG vaporizer cabinet to keep the outlet tubes at or above a minimum temperature such that the gas within the outlet tubes remains in gaseous form. The vapor pressure in the system is also monitored.

In this illustrated prior art embodiment, the vapor gas enters accumulator P118 at the top and is carried via a tube P119 inside the accumulator, the vapor pressure is sampled from the accumulator tank P118 and removed through port P134 for analysis via tubing P120 near the top of accumulator tank P118. The PID controlled mass flow assembly P114 minimizes flow irregularities of the sample.

Figure 2:
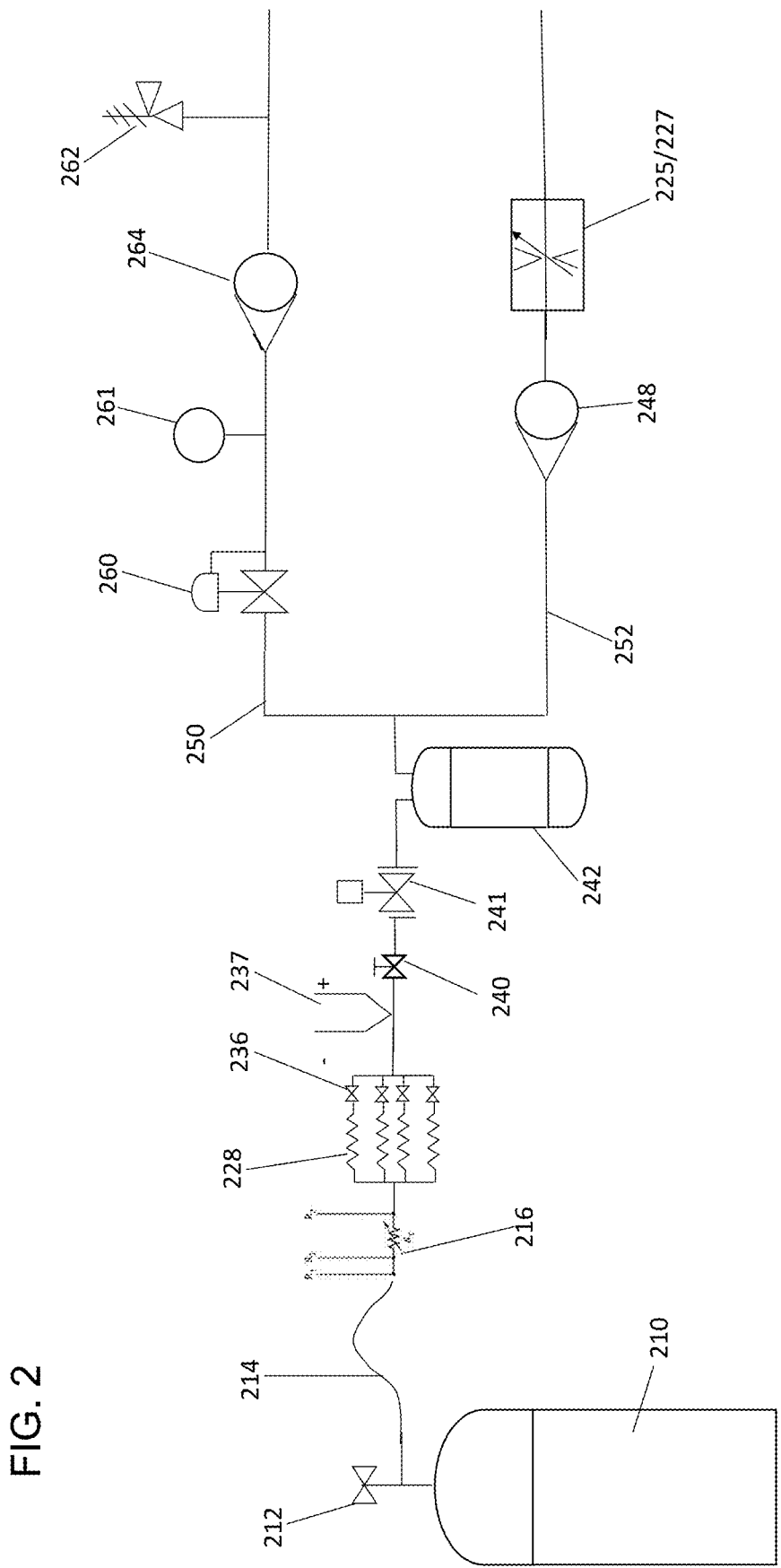
FIG. 2 is a schematic diagram of a vaporizing and measurement device in accordance with the present invention.
Figure 3:
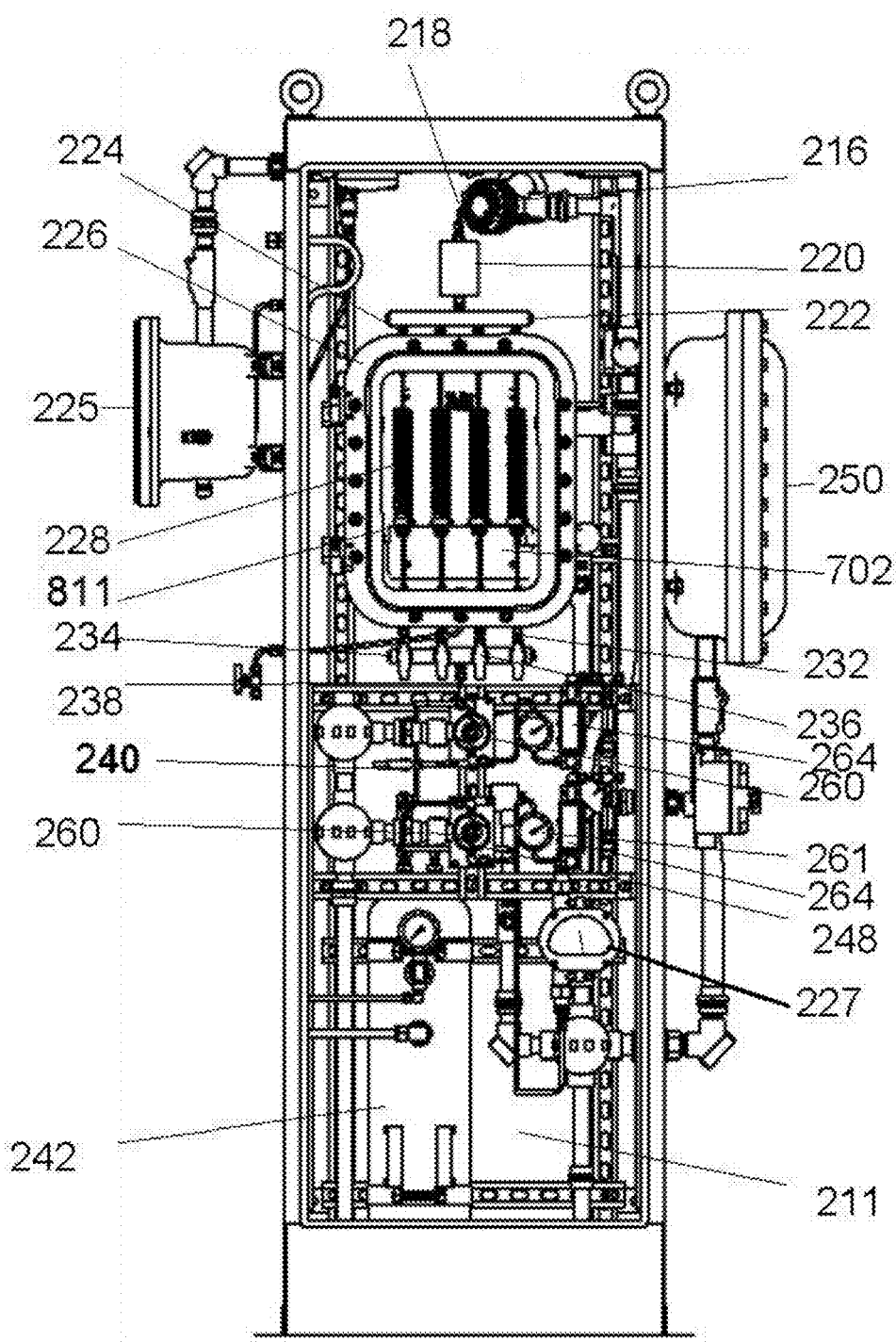
FIG. 3 is a drawing of an embodiment of a vaporizing and measurement system according to the invention.

FIGS. 2 and 3 illustrate a representation of an embodiment of a system according to the present invention. A liquid containing source vessel 210 (tank, pipeline, ship, railcar, truck, etc.) provides the liquid for processing by the system. That liquid feedstock when, for example, liquid natural gas (LNG), liquid nitrogen, liquid hydrogen, is at cryogenic temperatures. The invention is also usable for other non-cryogenic liquid feedstocks such as natural gas liquids (NGL). The liquid is extracted from the source vessel 210 through a valved output 212 and communicated downstream and into a conditioning cabinet 211 through conventional thermally insulating vacuum jacketed tubing 214 of the type, for example, described in Applicant's patent U.S. Pat. No. 8,056,399. Inside the cabinet, to promote uniform sample flow while minimizing fluid flow anomalies and lag time disruptions and to compensate for inlet pressure variation, a thermal mass flow meter 225 a flow controller such as a Brooks 5850i Mass Flow Controller from Brooks Instrument of Hatfield, Pa. with built in control valve and associated with PID (proportional-integral-derivative) control system 230 associated with a liquid bypass activated when the mass flow meter 225 detects a triggering sample inlet flow anomaly, to redirect the input liquid sample. In proper operating input conditions, the liquid sample is passed through a larger diameter tubing ¼ inch (0.635 cm) and to a Resistance Temperature Detector (RTD) 216 (see also FIG. 4) for monitoring the liquid temperature, then through a sweeping bend 218 (see also FIG. 5) to minimize flow disturbance, and through a thermal isolator 220 (See also FIGS. 14 and 15) to prevent upstream heat migration toward the RTD 216. From the isolator, the liquid passes into a vaporizer input distribution manifold 222 where it is divided into streams (See also FIG. 6) and passed through inlet tubes 224 to the into the top of individual vaporizer units 228 mounted on a bracket 702 (See also FIGS. 7, 8, 10 and 11) housed in an explosion-proof, multi-path vaporizer enclosure 226. Up to the introduction into the flash chamber in the vaporizer enclosure 226, the liquid input has been maintained at line conditions to prevent pre-vaporization because, as is well known in the art, a cryogenic liquid such as LNG, immediately begins to vaporize upon being exposed to heat energy. Accordingly, the tubing lengths within enclosure 211 connecting the various devices within the cabinet and particularly the multi-path vaporizer containing enclosure 226 is preferably kept as short as possible, i.e., to minimize the potential for vaporization prior to the liquid, particularly a cryogenic liquid, being introduced into the flash zone of the enclosure.

In the illustrated embodiment of FIG. 3, the four divided sample streams exiting the manifold 222 through fittings 224, are introduced to 3/16 inch (0.46 cm) tubing 229 which comprises the upper portion of the vaporizer unit sample tubing that tightly coils about a stainless-steel sheath encasing an electric heater cartridge to maximize the area of contact for efficient heat transfer to effectuate flash vaporization while minimizing hot spot formation resulting from exposed areas of the sheath.

Each of the individual vaporizer units 228 are securely mounted within the enclosure 226 to bracket 702 by a tube clamp 811 which engages each of the respective cartridge bases 809 (See also FIGS. 7, 8, 12 and 13). The vaporized samples exit the multi-path vaporizer enclosure 226 via output tubes 232 to output manifold 234 assembly (See also FIG. 9) for blending the respective output vapor streams. The manifold assembly incorporates a dedicated shut off valve 236 for each respective output tube 232 to terminate vapor flow from a respective vaporizer unit 228 upon detection of a vaporizer heater unit anomaly by an associated thermocouple 230. The vaporized sample then passes from the output manifold 234 through tubing 238 that includes a thermocouple 237 through a solenoid-controlled valve 241 that terminates flow if the vapor temperature detected by the thermocouple is less than 50° F. (10° C.) and into a sample accumulator 242. Also provided is a further shut-off valve 240 that will prevent introduction of liquid to the accumulator 242 in the event of a serious system malfunction.

Following introduction of the vaporized sample to the accumulator 242 under normal operations, the mixed accumulator sample is them output from the accumulator 242 one of plurality of streams. As illustrated in FIG. 2 those include a sample capture stream 250 and higher flow rate sample recycle/bypass stream 252. The sample capture stream 250 which does not require a substantial sample volume, is directed to analyzer sample capture cylinders or even directly to an analyzer by first passing through a heated pressure regulator 260 such as a Mustang Heated Regulator (MHR) available from Applicant or alternatively, an upgraded adjustable multi-stage regulators of the type described in Applicant's patent U.S. Pat. No. 11,144,078. Following pressure regulation, the sample stream passes through a pressure gauge 261, a pressure relief valve 262, and a rotameter 264 from which the mixed accumulator vaporized sample exits the cabinet 210 to sample collection grab cylinders, composite sampling collection cylinders, or directly to a downstream analyzer. In larger systems where it is desirable to simultaneously pass dedicated sample streams to a discrete set of grab cylinders and directly to an analyzer, multiple sample capture streams may be used. For example, the system depicted in FIG. 3 includes two, parallel sample capture stream, each including its own heated pressure regulator 260, etc. The recycle/bypass stream 252, which is contemplated to receive the greater volume of mixed sample output from the accumulator 242 includes a rotameter 248 and is associated with in-line mass flow controller 225 and gauge 227 to direct the recycle stream flow for recycling into the liquid source or to flare.

In the disclosed embodiment, either a PLC (programmable logic controller) controller or a PID (proportional-integral-derivative) control system 250 may be used to provide robust control over the connected components, improving response time and allowing for data logging. The encased PLC/PID control system 250 is affixed to the exterior cabinet and connected to the interior electrically controlled components including sensors, heaters, thermocouples, solenoid vales and flow meters either physically via hardwired connections or wireless communication technology via conventional signal receiving elements. Furthermore, the PLC/PID control system 250 allows for connection of phased solid-state relays to enhanced heater cartridge control in the vaporizer enclosure which in turn provides a benefit of prolonging cartridge life by avoiding energy pulsing due to its ability to control temperature in a limited range, e.g., +/−½° C. In the case of a PLC controller, when programmed appropriately, it will allow for a system soft start to prevent heater overshooting and system shock while also improving alarming function and enhancement of solid-state relays with a duty load indicator.

Examples of PLC/PID controllers usable in the context of the invention include PLCs of the Allen Bradley Micro800 Controller series from Rockwell Automation of Milwaukee, Wis. and PIDs from Oven Industries of Mechanicsburg, Pa., U.S. and Watlow of St. Louis, Mo., U.S. Upon receiving a signal of an operational anomaly indicated a system parameter (temperature pressure or flow rate) deviation beyond a select threshold or in the event of system power loss, the PLC/PID controller responds rapidly to automatically terminate flow, locally or globally, by energizing or de-energizing select solenoid-controlled valves and the mass flow controller 225.

Referring now to the more detailed illustrations, FIGS. 4 through 14, they provide greater detail of illustrate certain of the specific components referred to above.

Figure 4:
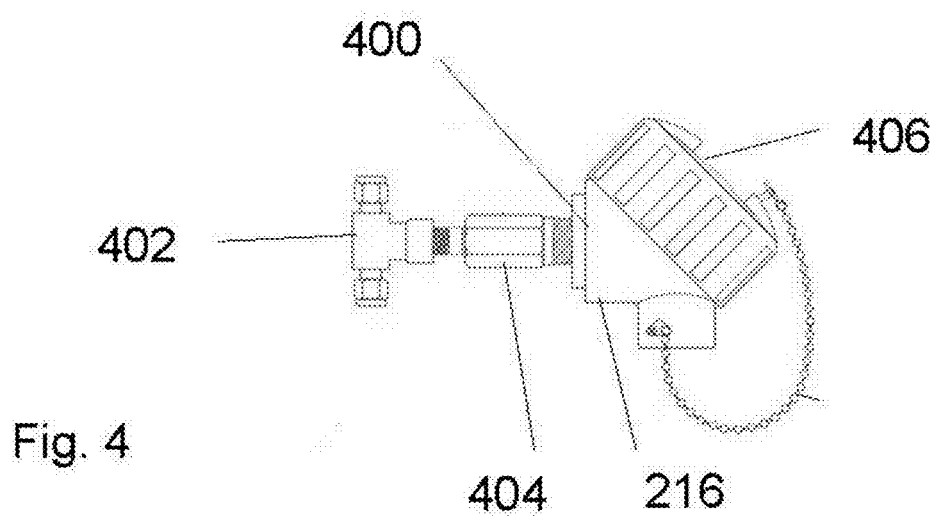
FIG. 4 is a drawing of a detail of an RTD (Resistance Temperature Detector) assembly according an embodiment of the invention.

FIG. 4 depicts the details of the assembly 400 comprising a programmable resistance thermal device (RTD) 216 which improves accuracy of inlet temperature measurement over conventional thermocouples and minimizes pressure loss through the measurement device. As the cryogenic liquid passes through the tee 402, some is directed to the RTD. The assembly detects the temperature of the liquid sample from the source vessel or tank 210 when passing through the female branch tee 402 that is affixed in-line to the ¼ inch (0.635 cm) input tube with proper NPT fittings 404. The signal representative of the temperature is transmitted by a transmitter (not illustrated) to the system control unit where the RTD is entirely contained within an explosion-proof housing sealed with a screw cover connection head 406. Reliance on an RTD provides linear characteristics based on established resistance for single point calibration without reference to other electrical measurements. Compared to conventional thermocouples, the RTD eliminates uncertainty based on the need for two or more reference voltages and unlike conventional thermocouples which require at least two sensors, one being the cold junction, the RTD does not require calibration associated with the particular electronics. The RTD 216 in this embodiment is also associated with a bypass loop to direct liquid input away from the underlying vaporizer assembly when the detected temperature of the input fluid exceeds a pre-selected minimum over which the liquid sample will be subject to pre-vaporization or partitioning of heavier hydrocarbon components from light components of the incoming liquid composition.

Figure 5:
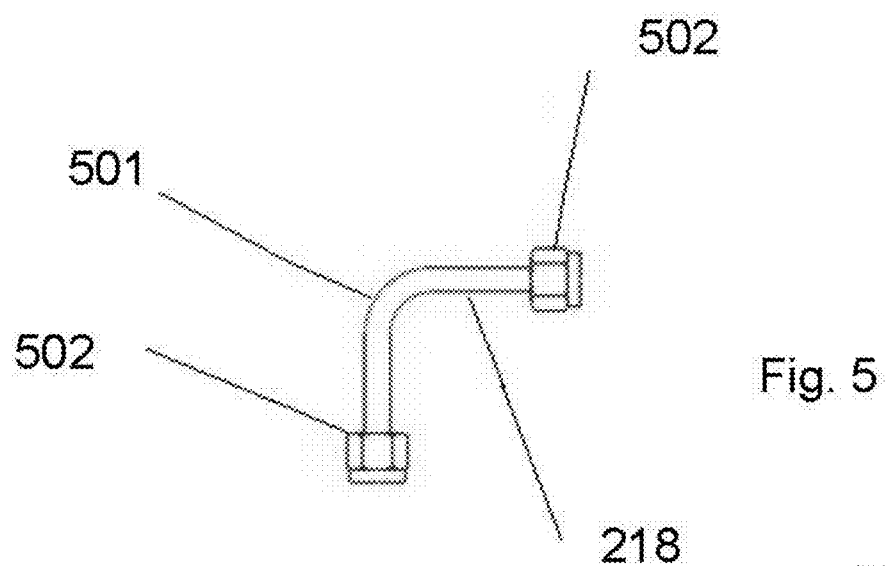
FIG. 5 is a drawing of a sweeping tube bend according to an embodiment of the invention.

FIG. 5 details an embodiment of a sweeping bend 218 connected by a short length of insulated tubing to the branch tee 402. The sweeping bend includes fittings 502 and a length ¼ inch (0.635 cm) tubing 501 arching 90° degrees to reduce pressure loss commonly resulting from implementation of standard elbow fittings in a fluid path. By minimizing pressure loss and avoiding pre-vaporization, the sweeping bend provides an operating capability at lower pressures, even down to 20 psi (138 kPa)

Figure 14:
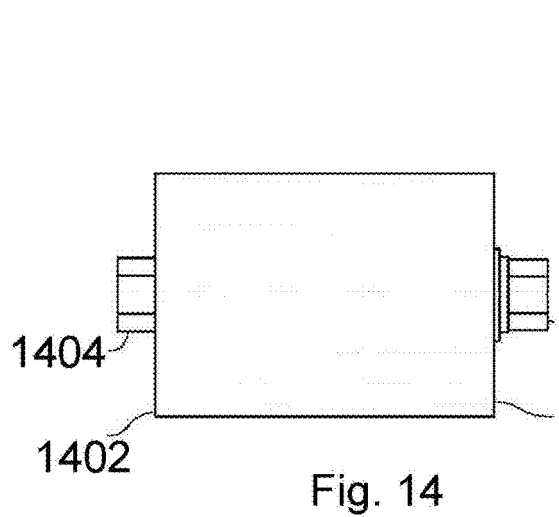
FIG. 14 is a side view of a thermal isolator break according to an embodiment of the invention.
Figure 15:
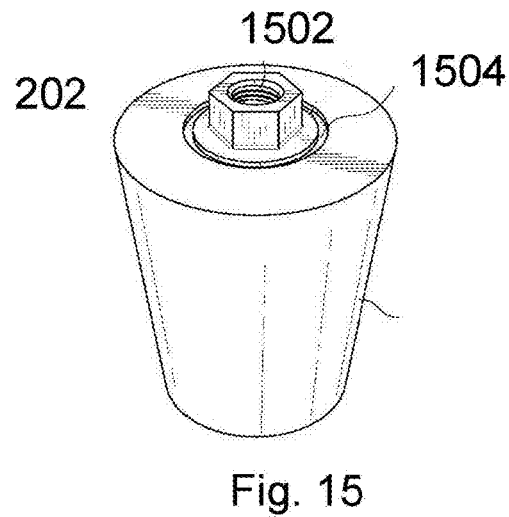
FIG. 15 is a perspective view of the thermal isolator break of FIG. 14.

Jumping to FIGS. 14 and 15, they illustrate an embodiment of a thermal isolator/break 220 corresponding in structure to that disclosed in Applicant's U.S. Pat. No. 11,248,735, the content of which is incorporated by reference in its entirety, and describes an outer insulating body 1402 encasing a ¼ inch (0.635 cm) fluid passageway 1502 passing through NPT fittings 1404 and extending through the length insulating body 1402. The NPT fittings project from the insulating body 1402 end faces and are seated in complementary end face recesses 1504. The construct of the passageway 1502 and the insulating body minimize heat energy transfer between the fittings to prevent undesired pre-vaporization of the incoming liquid sample that can occur from heat migration from the underlying vaporizer enclosure 226 via the manifold 222.

Figure 6:
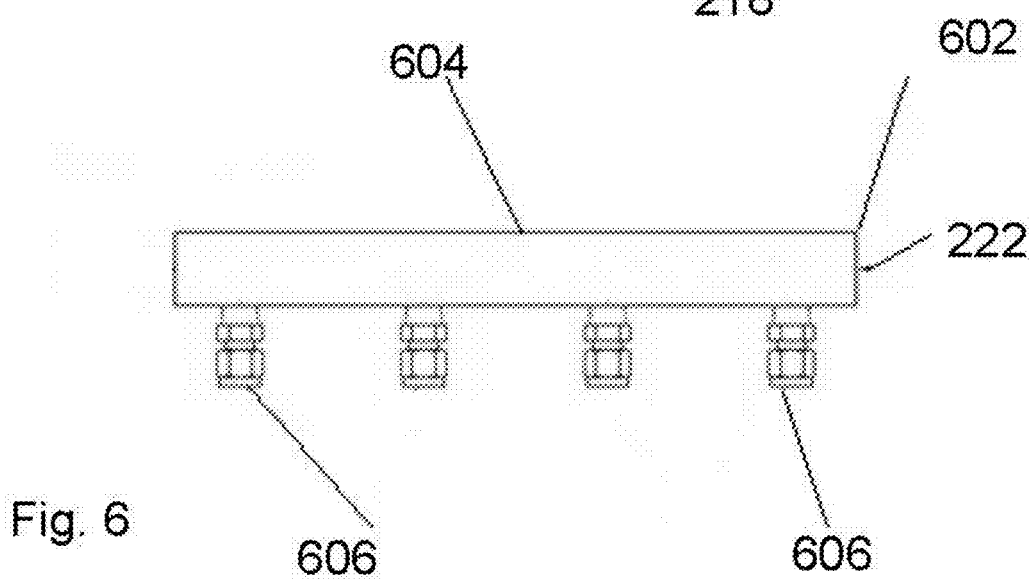
FIG. 6 is a top view of a vaporizer assembly input manifold according an embodiment of the invention.

Referring now to FIG. 6, after passing through the thermal isolator/break 220, the incoming liquid stream passes into the input stream splitting manifold 222. As illustrated in FIG. 6, the manifold 222 is established by a body 602 containing machined interior channels that split the incoming stream from input 604 into four uniform, discrete streams which are then output through NPT fitting outlets 606 into 3/16 inch (0.46 cm) ID tubing. This manifold assembly structure promotes even distribution of the input liquid to the underlying vaporizer assembly 226.

Figure 7:
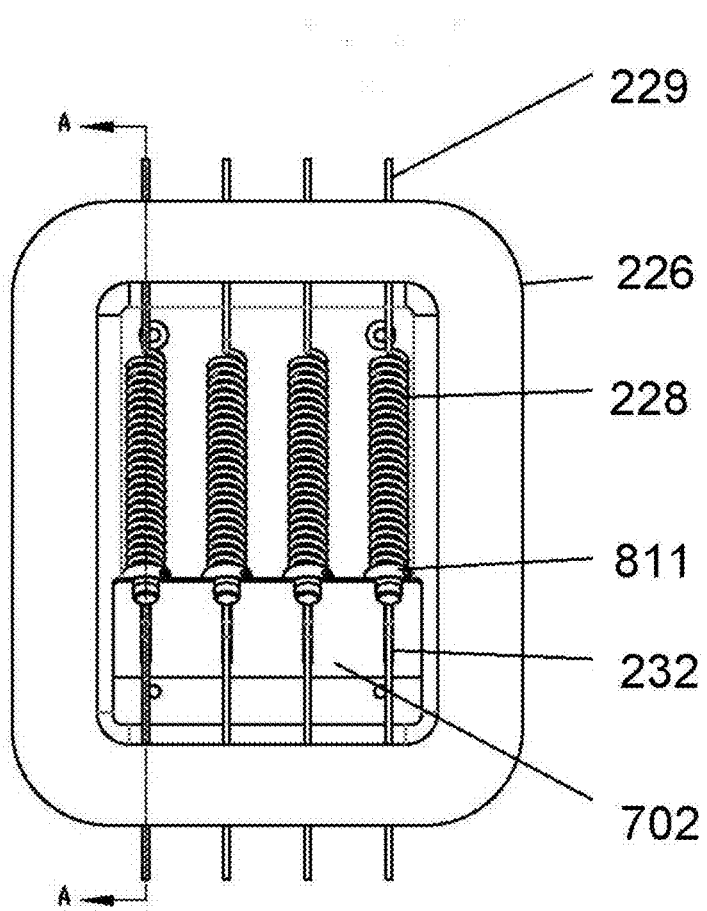
FIG. 7 is a front view of a vaporizer enclosure assembly with four bracket mounted heating elements according to an embodiment of the invention.
Figure 8:
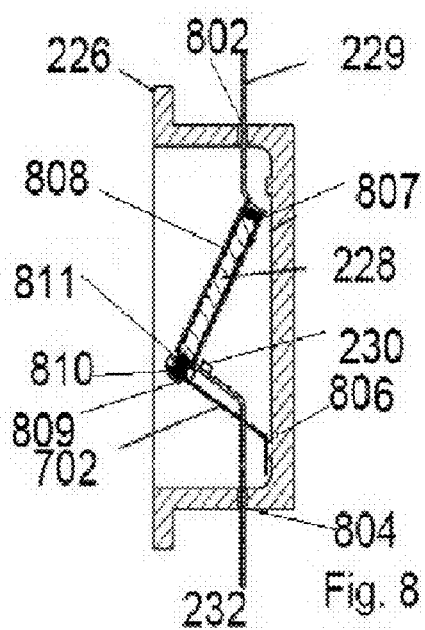
FIG. 8 is a side cutaway view along section A-A of a vaporizer enclosure of FIG. 7 depicting a vaporizer heating element as mounted on a bracket according to an embodiment of the invention.

FIGS. 7 to 13 illustrate the multi-path vaporizer enclosure 226 and its components. Each of the multipath vaporizer structures illustrated in FIG. 7, are secured within the enclosure 226 by an electrical power providing shaft collar to a mounting bracket 702 to provide for precise alignment within the enclosure to correspond with upper and lower feedthroughs 802 and 804, to provide precise angling of each unit 228 within the enclosure 226, to maintain separation from the enclosure walls, to establish uniform spacing between the respective units 228 and to facilitate maintenance access. The sample carrying tube 1228 includes upper inlet segment 1229, coiled tubing section 1227 and lower outlet segment 1232.

To effectively convert the incoming liquid sample into vapor and minimize exposure of the actual heating element 808 contained in heater cartridge unit 228 to the enclosure interior, the coil tubing section 1227 has a select height greater than the length of each encircled heater cartridge comprising unit 228 to extend above the upper end 807 thereof to prevent exposure of the top of the heater cartridge. The tubing section is also spirally wrapped around the heater cartridge at a pitch to minimize spacing between turns, maximize the contact surface area of the coil tubing section 1227 with the heater cartridge to enhance heat exchange, and minimize pressure drop across the coil tubing length. Each of the vaporizer units 228 includes a lower projecting mounting section 809 extending from the heater element 808 below the heat exchange coiling which is engaged by removable tube clamp 811 to affix to the mounting bracket 702 in a respective slot 810. A bolt on, type J thermocouple 230 is disposed below the coil tubing section 1227 along the orthogonally projecting segment of the tubing 1230. The straight tubing segment 1230 ends at an obtuse angle bend (to avoid unnecessary pressure drop) leading to segment 232 that align with and passes through the vaporizer enclosure outlet 804.

Figure 10:
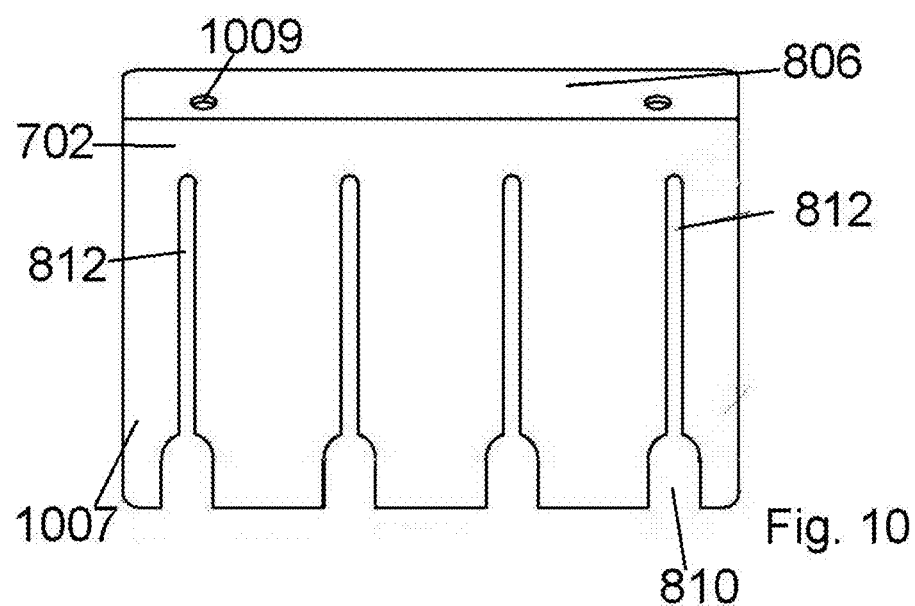
FIG. 10 is a front view of the heater mounting bracket according to the embodiment of the invention illustrated in FIGS. 7 and 8.
Figure 11:
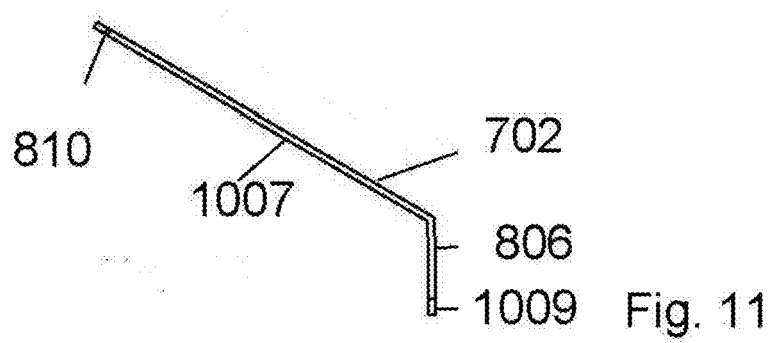
FIG. 11 is a side view of the vaporizer heater mounting bracket according to the embodiment of the invention illustrated in FIGS. 7 and 8.
Figure 12:
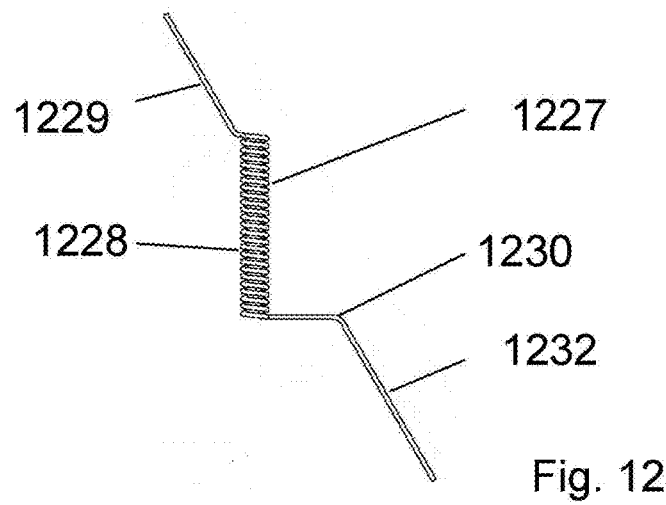
FIG. 12 is a side view of a vaporizer gas tubing coil according to the embodiment of the invention illustrated in FIGS. 7 and 8.
Figure 13:
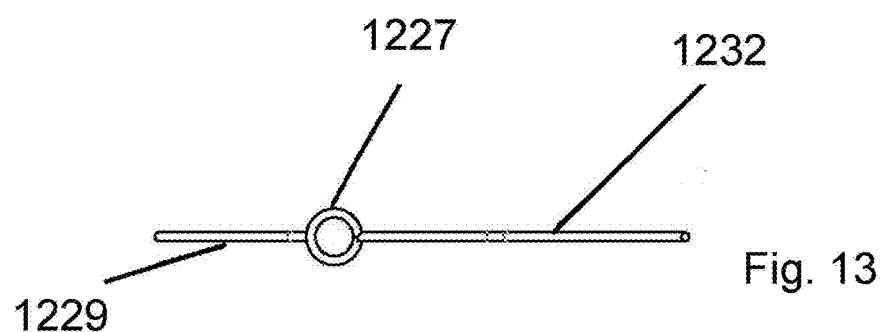
FIG. 13 is a bottom view of the vaporizer gas tubing embodiment of the invention illustrated in FIGS. 7 and 8.

The vaporizer unit mounting bracket 702 is detailed in FIGS. 10 and 11. It includes a lower mounting plate portion 806 with mounting bolt holes 1009 to secure the bracket to the interior rear wall of the vaporizer enclosure 226. A retaining plate portion 1007 projects at an angle from the mounting plate portion 806. Orthogonally disposed and extending from the opposite edge of plate portion 807 are a set of four vapor unit retaining slots 810 sized to cooperate with the mounting tube clamp 811 to positionally stabilize the respective unit. The vaporizing unit retaining slots 810 taper to slot extensions 812 which are dimensioned to provide a width sufficient to accommodate passage of tubing segment 232 and a length aligning with the underlying enclosure outlet 804.

The enclosure structure, accordingly, provides for enhanced ease of access and simplified maintenance. In effect, it provides a modular construction where a heater cartridge element may be easily dismounted from the mounting plate 702 by loosening and removing the tube clamp 811 and sliding the unit through the slot 810. A replacement heater element cartridge may then be reinserted into the coiled tubing and secured through the slot 810 using the tube clamp 811.

Figure 9:
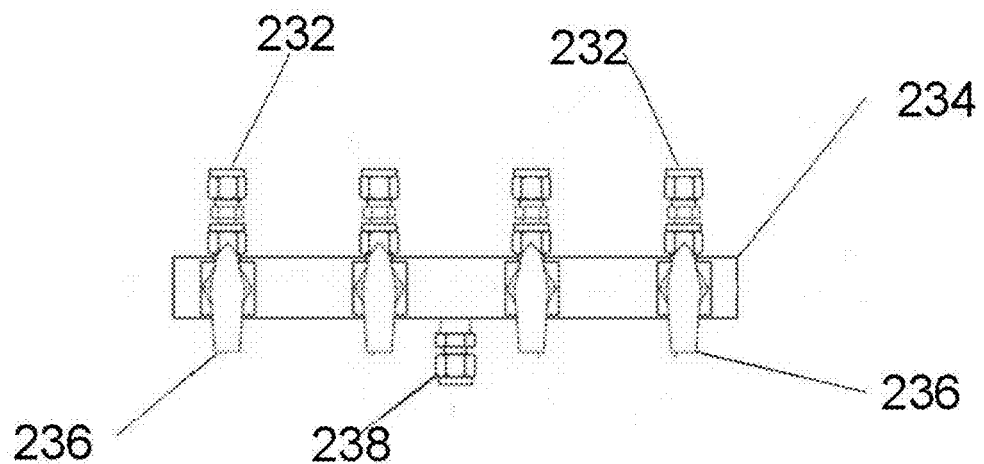
FIG. 9 is a front view of a vaporizer assembly output manifold according to an embodiment of the invention.

FIG. 9 illustrates a vaporizer outlet manifold assembly 234 according to the illustrated embodiment. The vaporizer manifold comprised a one-piece exit manifold incorporating an input 232 and mounted shutoff valve 236 for each of the sample pathways which reduces the space required to blend four streams into one. The body of the outlet manifold assembly 234 includes an aluminum block that is machined to provide an enlarged, interior chamber that acts as an accumulator of the vaporizer outputs and effectively buffers against any differential pressure drop and increased lag time while promoting more uniform downstream flow through output 238. Each shut-off valve 236 can be manually operated but preferably is subject to electronic control by the PID controller system 250 to terminate the flow from one or more of the vaporizer units 228 when the vaporizer(s) output may be compromised by a heater anomaly as detected by the associated thermocouple. In such a case the output from a compromised vaporizer unit can be shut down by the corresponding valve 236 to isolate the compromised gas stream while the manifold assembly 234 continues to provide an adequate outlet volume flow subject to minimal differential pressure and flow loss resulting from such shutdown.

As gas exits the output manifold 234, it travels through ¼ inch (0.635 cm) tubing through another thermocouple (not illustrated) associated with a manual shutoff valve 240 then through the cryogenic solenoid valve 241, the redundancy being incorporated to prevent any liquid, at all, from being introduced into the top of downstream accumulator device 242 of the type described in Applicant's prior art illustrated in FIG. 1. In brief, the vapor enters through the top of the accumulator, is carried via a tube to the low, interior location within the accumulator 242 and directed toward the inside wall thereof to mix with the vapor gas already resident in the accumulator 242. Extraction of the accumulated sample is achieved via an output tube that passes through valved tubing to a heated pressure regulator to further reduce the sample pressure for compatibility with the design requirements of a grab sample system or composite sample system such as that described in Applicant's patent U.S. Pat. No. 9,562,833 or directly downstream to analyzer/chromatograph.

Figure 16:
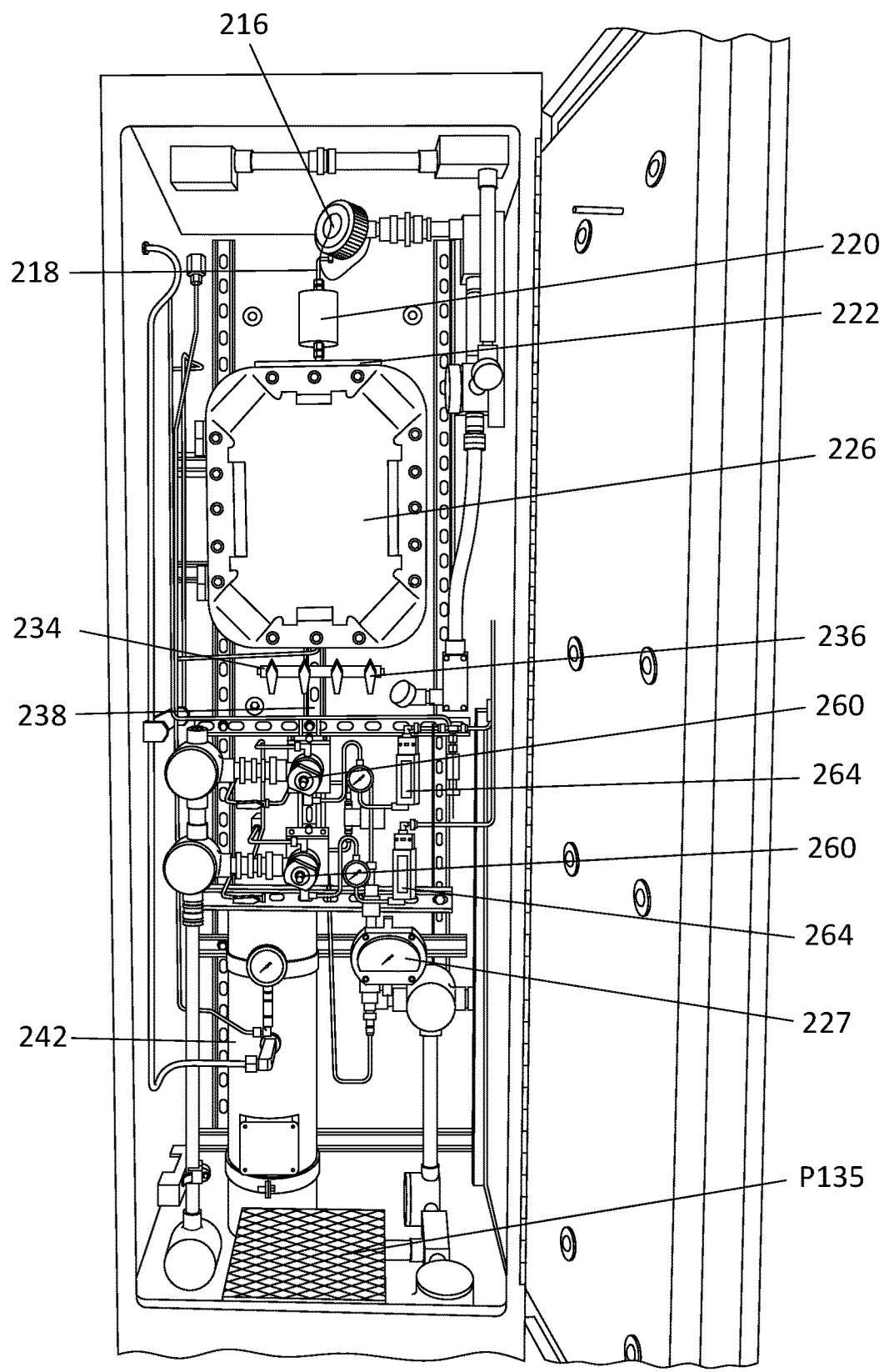
FIG. 16 is a photographic view of an embodiment of the invention as constructed.

Comparative performance established by testing demonstrates the significant operational improvement provided by the present invention. In a comparative test using liquid nitrogen as a reference cryogenic fluid, which has a lower boiling point than cryogenic LNG, measurements were taken of 1) system startup time to achieve pressure dependent, stable vaporization temperature from ambient to cooling to −300° F. (−184° C.) as measured by the RTD , 2) the sample flow rate at the bypass mass flow controller, and 3) the pressure drop measured from the liquid sample input before the RTD to the input of the accumulator tank. Specifically, the test between the prior art and the embodiment of the present invention illustrated in FIGS. 3 and 16, confirmed the reduction of system start up time by 62%-66%, while providing increased flow rate by 29% and decreased pressure drop by 72%. These results demonstrate markedly improved performance over that of the prior art system. Furthermore, testing showed the present invention is able to achieve full operational conditions even at an inlet pressure as low as 20 psi (138 kPa) and a 110° F. (43° C.) starting ambient temperature, the system stabilized approximately 4 minutes under an operationally desirable threshold of 30 minutes. In short, the faster startup time corresponds to reduced operational costs, enhanced operational performance and improved recovery time and an ability to maintain higher internal accumulated pressures relative to respective inlet pressure even when processing at lower input pressures, e.g., below 50 psi (344 kPa). In short, the system provides for faster recovery time and enhanced performance even when subject to low and changing process pressures.

While various aspects of the present invention have been particularly shown and described with reference to the exemplary, non-limiting, embodiments above, it will be understood by those skilled in the art that various additional aspects and embodiments may be contemplated without departing from the spirit and scope of the present invention. Other aspects, objects and advantages of the present invention can be obtained from a study of the drawings, the disclosure and the appended claims.

VI. INDUSTRIAL APPLICABILITY

The invention provides for a system resulting substantially greater control of the liquid sample vaporization process during conditioning for passage to an associated analyzer by improving steady state conditions exhibiting and better control of thermal conditions, a decrease in pressure drops across the system while maintaining volumetric flow and vaporization, even at very low sample pressures of down to 10 psi (69 kPa), below the approximately 14 psi (97 kPa) level commonly experienced in LNG bunkering ships. The invention also provides for intelligent performance allowing for faster start-up, avoiding shutdown to permit continuous performance even in the event of isolated detected anomalies. The invention not only provides operations at lower pressures but also versatility for large scale transfer operations, e.g., ship to shore, by providing substantially fully automated control desired by operators. Further the invention provides an improved vaporizer enclosure structure employing angled, modular heater cartridge units maximizing heat exchange, prolonging useful cartridge life, and providing for efficient maintenance and replacement.

What is claimed is:

1. An improved vaporizer and conditioning system for liquid, including a liquid sample input, a vaporizer operable to receive a liquid sample and convert the received liquid sample into vapor gas that is passed to an accumulator tank operable to receive the vaporized sample and a heated pressure regulator for conditioning the accumulated vaporized sample outputted from the accumulator tank to reduce the pressure thereof for passage by at least a first vapor sample outlet path to a downstream analyzer, the improvement comprising, in sequence:
   a) a resistance temperature detector unit in-line with the liquid sample input;
   b) a sweeping bend located in-line and downstream of the resistance temperature detector unit;
   c) a thermal break for minimizing heat energy transfer locate in-line and downstream of the sweeping bend;
   d) a flow buffering input manifold located in-line and downstream of the thermal break, the flow buffering input manifold including a liquid sample input receiving chamber, splitting the liquid sample input in the receiving chamber into a plurality of outputs from the receiving chamber to reduce pressure drop and provide flow volume uniformity;
   e) where the vaporizer includes a vaporizer housing containing a plurality of liquid sample inputs and vapor outputs corresponding to the plurality of outputs from the flow buffering input manifold and a heater cartridge unit associated with each of the plurality of liquid sample vaporizer inputs characterized by:
      i) a heater cartridge with an upper end and a lower end, said heater cartridge including an elongated electrically powered heating element of a select length,
      ii) a coil tubing segment having a select height greater than the elongated electric heater element select length to extend above thereof, and spiral wrapping with reduced spacing between turns, configured to increase the contact surface area of the coil tubing with the elongated electric heating element, and limit pressure drop across the coil tubing segment,
      iii) a thermocouple, disposed below the coil tubing segment, and
      iv) an output; and
   f) an exit manifold incorporating a plurality of vapor inputs corresponding to the plurality of vapor outputs from the vaporizer housing, each vapor input including a shutoff valve to terminate vapor flow, said exit manifold including an interior vapor accumulator chamber to mix the respective plurality of vapor inputs into a common vapor output stream, and an output for the common output stream from the interior vapor accumulator, chamber, an exit manifold thermocouple associated with the exit manifold output stream and a shut off valve for preventing flow to the accumulator tank when a temperature anomaly is detected by the exit manifold thermocouple;
   where the vaporizer housing includes: a back wall, a top wall, a bottom wall, an angled mounting plate defining a front edge, a back section affixed to the back wall proximate to the bottom wall, said mounting plate projecting at an acute angle from the back wall relative to the bottom wall, said mounting plate including at least one receiving slot formed in the front edge with a tapered slot extending therefrom for a select distance in the direction of the back section;
   where each coil tubing segment includes a n elongated cylindrical passage of a defined diameter and a first length and a lower segment generally orthogonally disposed to the coil elongated cylindrical passage and where each electrically powered heating element has a diameter corresponding to that of the elongated cylindrical passage and the lower end of the heater cartridge projects through the receiving slot of the angled mounting plate; and
   a releasable clamp for engaging the lower end of the heater cartridge to secure the heater cartridge to the mounting plate,
   where a heater cartridge is removable by releasing the releasable clamp from the lower end of the heater cartridge and the mounting plate and sliding the heater cartridge from the coil tubing segment.

2. The improved vaporizer and conditioning system for liquid of claim 1 where the at least one vapor sample outlet path is a line from the accumulator tank and includes a heated pressure regulator, a rotameter, a pressure relief valve and a downstream vapor sample outlet for downstream analysis and a bypass pathway including a rotameter and mass flow controller for outputting unused vapor sample.

3. The improved vaporizer and conditioning system for liquid of claim 2 where the bypass pathway recycles the unused vapor sample.

4. The improved vaporizer and conditioning system for liquid of claim 1 further comprising a PID controller for controlling electrically controlled components including sensors, heaters, thermocouples, solenoid valves and rotameters.

5. The improved vaporizer and conditioning system for liquid of claim 1 further comprising a PLC controller for controlling electrically controlled components including sensors, heaters, thermocouples, solenoid valves and rotameters.

6. The improved vaporizer and conditioning system for liquid of claim 1 further comprising a thermal mass flow controller.

7. An improved vaporizer and conditioning system for liquid, including a liquid sample input, a vaporizer operable to receive a liquid sample and convert the received liquid sample into vapor gas that is passed to an accumulator tank operable to receive the vaporized sample and a heated pressure regulator for conditioning the accumulated vaporized sample outputted from the accumulator tank to reduce the pressure thereof for passage by at least a first vapor sample outlet path to a downstream analyzer, the improvement comprising, in sequence:

a) a resistance temperature detector unit in-line with the liquid sample input;

b) a sweeping bend located in-line and downstream of the resistance temperature detector unit;

c) a thermal break for minimizing heat energy transfer located in-line and downstream of the sweeping bend;

d) a flow buffering input manifold located in-line and downstream of the thermal break, the flow buffering input manifold including a liquid sample input receiving chamber from which the liquid sample input in the receiving chamber is split into a select number of outputs from the receiving chamber;

e) a vaporizer housing containing a select number of liquid sample vaporizer inputs and vaporized vapor outputs corresponding to the select number of outputs from the flow buffering input manifold, said vaporizer housing including a back wall, a top wall and a bottom wall where the top wall includes the select number of liquid sample vaporizer inputs and the bottom wall includes the select number of vaporized vapor outputs and an angled mounting plate defining a front edge and back section affixed to the back wall proximate to the bottom wall, said mounting plate projecting at an acute angle from the back wall relative to the bottom wall, said mounting plate including at least one receiving slot formed in the front edge with a tapered slots extending therefrom for a select distance in the direction of the back section;

f) a heater unit with atop portion, a bottom portion and an electrically powered elongated heating element disposed therebetween associated with each of the select number of liquid sample vaporizer inputs in the vaporizer housing, said electrically powered elongated heating element having a select length and select diameter;

g) a continuous length of tubing in the vaporizer housing, passing through a coil tubing segment having a select height greater than the electrically powered elongated heating element select length, and spiral wrapping with reduced spacing between turns, configured to increase the contact surface area of the coil tubing with the electrically powered elongated heating element and limit pressure drop, said coil tubing segment defining an elongated cylindrical passage of a diameter corresponding to the select diameter of the electrically powered elongated heating element, a lower segment generally orthogonally disposed to the elongated cylindrical passage, and a vapor output segment;

a thermocouple, disposed below the coil tubing segment; and a releasable clamp for engaging the bottom portion of the heater unit to secure the heater unit to the mounting plate where the vapor output segment of the tubing passes through the tapered slot of the mounting plate to the respective vaporized vapor output in the bottom wall, where the heater unit is removable by releasing the releasable clamp from the bottom portion and the mounting plate and sliding the heater unit from the bottom of the coil tubing segment;

h) an exit manifold incorporating a select number of vapor inputs corresponding to the select number of vaporized vapor outputs from the vaporizer housing, each vapor input including a shutoff valve to terminate vapor flow, said exit manifold including an interior vapor accumulator chamber to mix the respective select number of vapor inputs into a common vapor output stream, and and output for the common output stream from the interior vapor accumulator chamber and i) an exit manifold thermocouple associated with the exit manifold output stream and a shut off valve for preventing flow to the accumulator tank when a temperature anomaly is detected by the exit manifold thermocouple.

8. The improved vaporizer and conditioning system for liquid of claim 7 where the at least one vapor sample outlet path is a line from the accumulator tank and includes a heated pressure regulator, a rotameter, a pressure relief valve and a downstream vapor sample outlet for downstream analysis and a bypass pathway including a rotameter and mass flow controller for outputting unused vapor sample.

* * * * *